US008641098B2

(12) United States Patent
Schrade et al.

(10) Patent No.: US 8,641,098 B2
(45) Date of Patent: Feb. 4, 2014

(54) BELT RETRACTOR FRAME

(75) Inventors: Wolfgang Schrade, Blaustein (DE);
Hans-Juergen Divo, Langenau (DE)

(73) Assignee: Takata AG, Aschaffenburg (DE)

(*) Notice: Subject to any disclaimer, the term of this patent is extended or adjusted under 35 U.S.C. 154(b) by 0 days.

(21) Appl. No.: 13/564,383

(22) Filed: Aug. 1, 2012

(65) Prior Publication Data

US 2012/0292421 A1 Nov. 22, 2012

Related U.S. Application Data

(63) Continuation of application No. PCT/DE2011/050001, filed on Jan. 27, 2011.

(51) Int. Cl.
*B60R 22/34* (2006.01)

(52) U.S. Cl.
USPC .......................................... 280/807

(58) Field of Classification Search
USPC ............ 242/379, 379.1; 280/801.1, 806–807; 297/476–479
See application file for complete search history.

(56) References Cited

U.S. PATENT DOCUMENTS

| 4,621,836 A | 11/1986 | Mori et al. |
| 4,909,541 A * | 3/1990 | Tokugawa .................. 280/801.2 |
| 5,740,979 A * | 4/1998 | Rohrle ........................ 242/382 |
| 5,823,628 A * | 10/1998 | Matsuo ......................... 297/475 |
| 5,951,046 A * | 9/1999 | Hosoda et al. .............. 280/801.2 |
| 6,224,129 B1 * | 5/2001 | Cisternino et al. .......... 296/65.03 |
| 6,254,191 B1 | 7/2001 | Yamamoto et al. |
| 6,354,529 B1 * | 3/2002 | Asagiri et al. ................ 242/379 |
| 7,484,763 B2 * | 2/2009 | Ehlers et al. .................. 280/807 |
| 2007/0114317 A1 | 5/2007 | Fauser |

FOREIGN PATENT DOCUMENTS

| DE | 33 43 104 A1 | 6/1985 |
| DE | 34 02 245 A1 | 7/1985 |
| DE | 195 10 603 A1 | 9/1996 |
| DE | 10 2005 055 681 A1 | 6/2007 |
| DE | 10 2006 049839 A1 | 5/2008 |
| GB | 2 020 963 A | 11/1979 |

OTHER PUBLICATIONS

Bair et al., Vehicle seatbelt winder housing with interlocking tabs, Sep. 26, 1996, German Patent Office, DE 195 10 603 A1, Machine Translation of Description.*
Bair et al., Vehicle seatbelt winder housing with interlocking tabs, Sep. 26, 1996, German Patent Office, DE 195 10 603 A1, English Abstract.*
International Preliminary Report on Patentability PCT/DE/2011/050001 dated Aug. 7, 2012.
International Search Report PCT/DE2011/050001 dated May 7, 2011.

* cited by examiner

*Primary Examiner* — James English
(74) *Attorney, Agent, or Firm* — Foley & Lardner LLP

(57) ABSTRACT

A belt retractor frame, which is suitable for fixing in a vehicle. The belt retractor frame has: at least one hook for hooking the belt refractor frame into a vehicle panel and at least one bent tab, which produces a preload with the vehicle panel after the at least one hook has been hooked in.

19 Claims, 4 Drawing Sheets

BELT RETRACTOR FRAME

CROSS-REFERENCE TO RELATED PATENT APPLICATIONS

This application is a continuation of International Patent Application Number PCT/DE2011/050001, filed Jan. 27, 2011, which was published in German as WO 2011/095161. The foregoing international application is incorporated by reference herein.

BACKGROUND

The invention relates to a belt retractor frame, which is suitable for fixing in a vehicle.

For reasons of cost, a belt retractor must be fixed quickly in a vehicle. It is accordingly the underlying object of the invention to indicate a belt retractor frame which allows rapid mounting in the vehicle.

SUMMARY

As described herein, this object is achieved by a belt retractor frame having the features recited herein. Advantageous embodiments of the belt retractor frame are also indicated described herein.

Thus, provision is made for the belt retractor frame to have at least one hook for hooking the belt refractor frame into a vehicle panel and at least one bent tab, which produces a preload with the vehicle panel.

One significant advantage of the disclosed belt retractor frame may be regarded as the fact that it allows very simple mounting since the belt retractor frame merely has to be hooked into a vehicle panel for mounting or pre-mounting. Nevertheless, a secure connection and subsequent freedom from rattling of the connection is ensured since the tab provided clamps the belt retractor frame to the vehicle panel as clearly described and fixes the belt refractor frame without play. After the belt refractor frame has been hooked in, it is, of course, possible to fix it additionally with other auxiliary means in order to prevent the belt retractor from breaking off, in the event of an accident for example.

Another significant advantage of the disclosed belt retractor frame is that mounting is also possible on a rectilinear panel edge of a vehicle panel, i.e. a panel edge without indentations. There is therefore no need for indentations in the region of the panel edge to allow fixing. Mounting or pre-mounting is therefore not restricted to specific predetermined panel edge geometries.

According to a particularly preferred embodiment of the belt retractor frame, provision is made for the at least one hook to have: a bearing section, which rests on a panel edge of the vehicle panel after the hook has been hooked in, and a rear engagement section, which adjoins the bearing section and engages behind the rear side of the vehicle panel after the belt retractor frame has been hooked in.

A 90° bent section or 90° bend is preferably arranged between the bearing section and the rear engagement section, and therefore the bearing section and the rear engagement section are perpendicular to one another.

For reasons of cost, it is regarded as advantageous if the belt retractor frame has a frame plate and the at least one hook is formed by a plate section which is bent out of the frame plate plane.

According to a particularly preferred embodiment, the belt retractor frame is formed by an integral frame plate which is bent several times and has a plurality of frame plate sections and a plurality of frame plate planes; in this case, the at least one hook is preferably formed by a plate section which is bent out of the frame plate plane of one of the frame plate sections.

The bearing section of the at least one hook is preferably formed by a first plate subsection, which is at an angle of 90° to the frame plate plane. The rear engagement section of the at least one hook is preferably formed by a second plate subsection, the direction of extension of which is parallel to the frame plate plane.

The second plate subsection is preferably embodied in such a way that it rests against the rear side of the vehicle panel by means of an inner plate edge after the belt refractor frame has been hooked in.

In respect of the at least one tab, it is regarded as advantageous if said tab extends from the connecting region thereof, which connects the tab to the rest of the belt retractor frame, in a direction which is antiparallel to the direction of extension of the rear engagement section of the hook. Here, the term "antiparallel" alignment is to be understood to mean that, although the tab extends parallel to the rear engagement section, the directions are opposed.

The at least one tab is preferably formed by a plate section of a frame plate which is bent out of a frame plate plane of the belt retractor frame in the direction of the vehicle panel. The tab is preferably bent in such a way that it exerts a pressure load on a surface section of the vehicle panel.

The surface section of the vehicle panel on which the tab exerts a preload is preferably at a distance from the panel edge of the vehicle panel.

The at least one tab and the at least one hook are preferably bent out of the same frame plate plane of the same frame plate section.

With a view to reliable fixing of the belt retractor frame, it is regarded as advantageous if the belt retractor frame has two hooks and one tab, wherein the tab is preferably arranged centrally between the two hooks, as seen in a view perpendicular to the frame plate plane of the frame plate.

It is also regarded as advantageous if there is a further frame plate section, which is arranged perpendicularly to the frame plate section having the at least two hooks, there is a hole with locking teeth in the further frame plate section, into which teeth a locking flange of the belt retractor can be inserted, and the arrangement of the two hooks is chosen in such a way that a virtual connecting line between the bearing sections of the two hooks runs parallel to the axis of rotation of the inserted locking flange.

The at least one hook and the at least one tab are preferably shaped and arranged in such a way that the belt retractor frame can be placed on a rectilinear panel edge section, without cutouts, of a panel edge of the vehicle panel.

The application discloses a belt retractor having a belt retractor frame as described above, a locking base and locking teeth.

Moreover, the application also discloses an arrangement having a belt retractor frame as described above.

In respect of this arrangement, provision is provided for at least two hooks of the belt refractor frame to be placed on a rectilinear panel edge section, without cutouts, of a panel edge of the vehicle panel.

In respect of the advantages of the arrangement, reference may be made to the above explanations of the advantages of the belt retractor frame because the advantages of the arrangement correspond substantially to those of the belt retractor frame according to the invention.

The belt retractor frame is preferably placed on a rectilinear panel edge section of a panel edge of a B pillar of the vehicle.

In a particularly preferred embodiment, a virtual connecting line runs horizontally between the bearing sections of the at least two hooks.

The rear engagement sections of the at least two hooks are preferably parallel to one another; the same applies to the bearing sections, which are preferably likewise parallel to one another.

BRIEF DESCRIPTION OF THE DRAWINGS

The invention is explained in greater detail below with reference to illustrative embodiments and, in the drawing, which is given by way of example.

DETAILED DESCRIPTION

For the sake of clarity, the same reference signs are used for identical parts throughout the figures.

Figure 1:
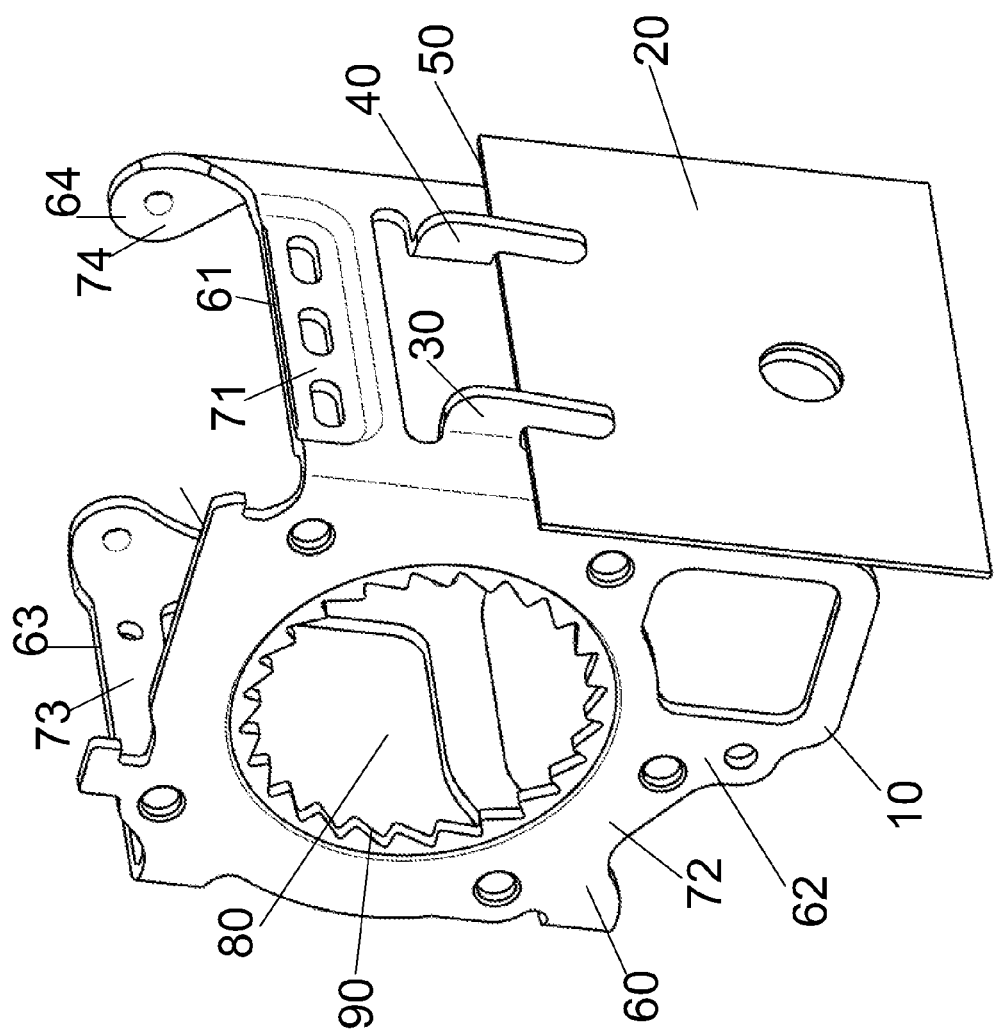
FIG. 1 shows an illustrative embodiment of a belt refractor frame according to the invention after mounting on a vehicle panel in a three dimensional view viewed from the rear side of the vehicle panel.

FIG. 1 shows an arrangement having a belt retractor frame 10 and a vehicle panel 20 of a vehicle, the rest of which is not shown. The vehicle panel 20 can be part of a B pillar (the rest of which is not shown) of the vehicle, for example.

It can be seen in FIG. 1 that the belt retractor frame 10 is provided with two hooks 30 and 40, which are placed on a rectilinear panel edge section, free from cutouts, of a panel edge 50 of the vehicle panel 20.

The belt retractor frame 10 is preferably formed by an integral frame plate 60 which is bent several times and, accordingly, has a plurality of frame plate sections 61, 62, 63 and 64, which are arranged in various frame plate planes 71, 72, 73 and 74. Frame plate planes 71 and 73 and frame plate planes 72 and 74 are arranged parallel or at least approximately parallel.

Arranged in frame plate section 62 is a hole 80 with locking teeth 90, into which a locking flange (not shown specifically) of the belt retractor can be inserted. Frame plate section 62 is perpendicular to frame plate section 61, in which the two hooks 30 and 40 are arranged.

FIG. 1 shows that the arrangement of the two hooks 30 and 40 is chosen in such a way that a virtual connecting line between the bearing sections of the two hooks would run parallel to the axis of rotation of the inserted locking flange and hence preferably horizontally on the panel edge 50.

Figure 2:
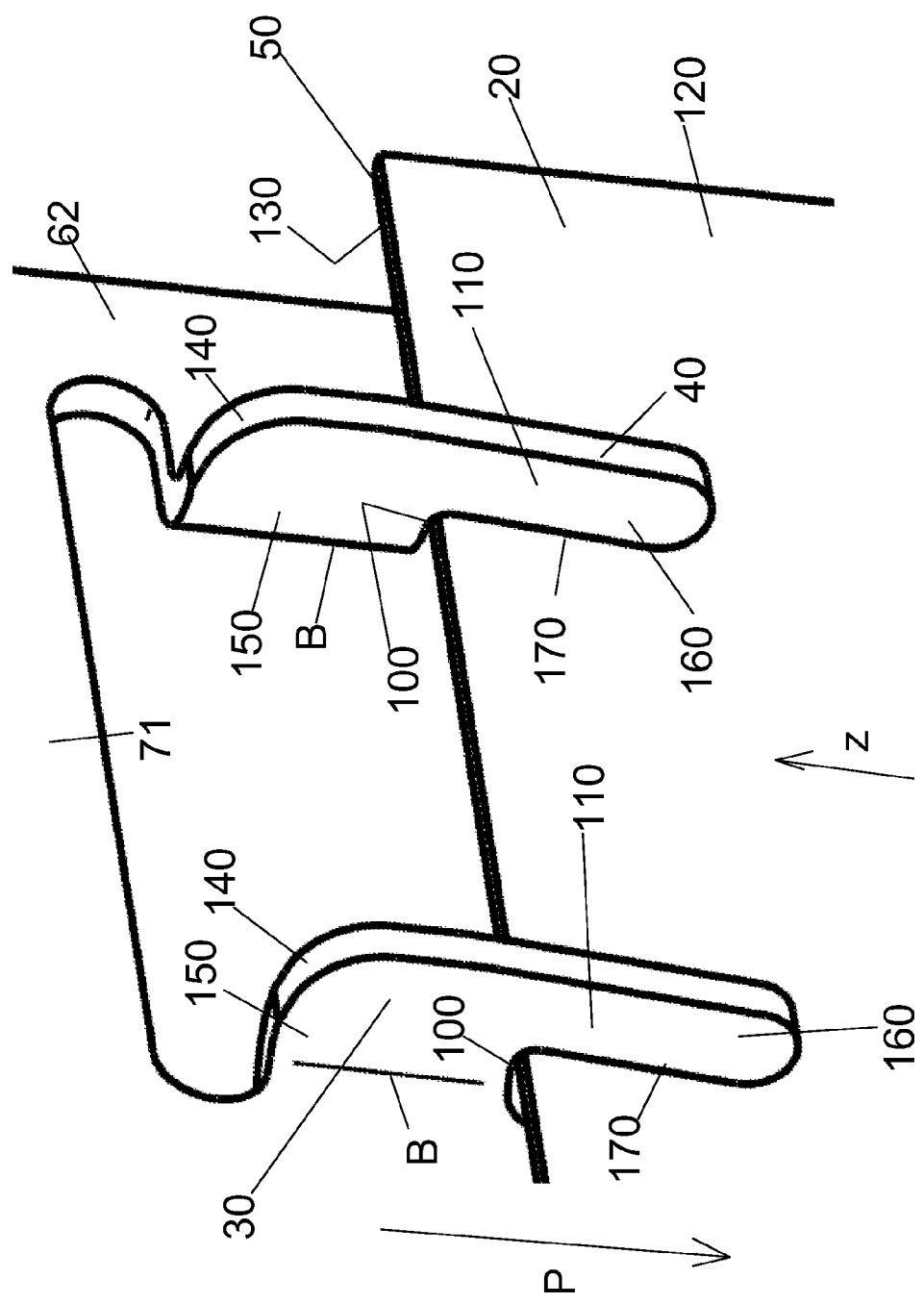
FIG. 2 shows the embodiment of the hooks in the illustrative embodiment shown in FIG. 1 in a detail view.

The two hooks 30 and 40 are shown in greater detail in FIG. 2. It can be seen that the hooks 30 and 40 are each formed by a plate section which is bent out of the frame plate plane 71 of the associated frame plate section 61 along a bending edge B.

The hooks 30 and 40 each have a bearing section 100, which rests on the panel edge 50 of the vehicle panel 20 after the respective hook has been hooked in. Adjoining the bearing section there is in each case a rear engagement section 110, which engages behind the rear side 120 of the vehicle panel 20 after the respective hook has been hooked in, as soon as the belt retractor frame 10 has been mounted or hooked in on the front side 130 of the vehicle panel 20.

The bearing section 100 and the rear engagement section 110 are connected to one another by a 90° bent section 140, with the result that the bearing section 100 and the rear engagement section 110 are perpendicular to one another.

The bearing section 100 of the two hooks 30 and 40 is in each case formed by a first plate subsection 150, which, by virtue of the bending edge B, is at an angle of 90 degrees to the frame plate plane 71 of the frame plate 61 and at an angle of 90 degrees to the z direction of the vehicle coordinate system.

The rear engagement section 110 is in each case formed by a second plate subsection 160, the direction of extension P of which is parallel to the frame plate plane 71 and counter to the z direction of the vehicle coordinate system.

The second plate subsection 160 preferably rests against the rear side 120 of the vehicle panel 20 by means of an inner plate edge 170 of the second plate subsection 160 after the belt retractor frame 10 has been hooked in.

Figure 3:
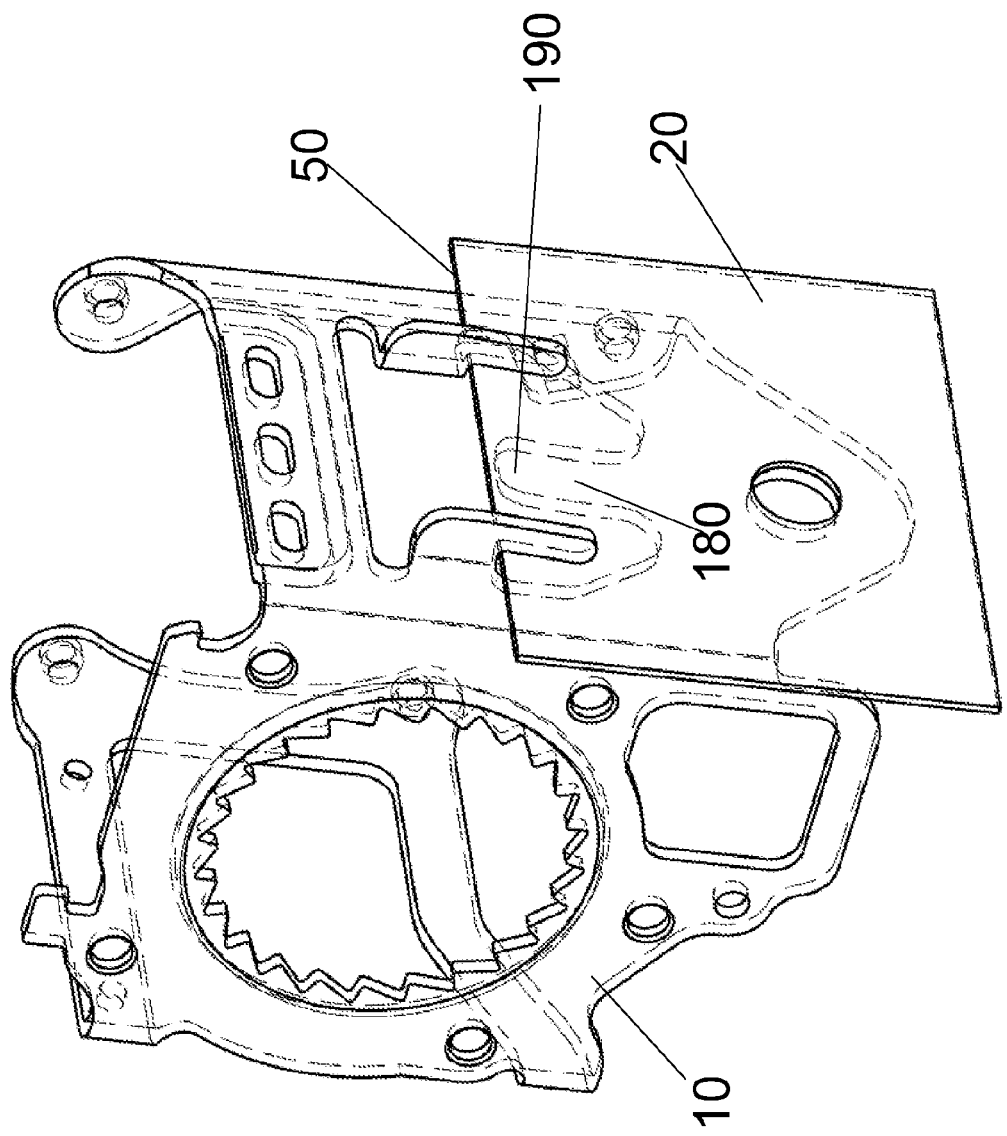
FIG. 3 shows the illustrative embodiment shown in FIG. 1 in a different view.
Figure 4:
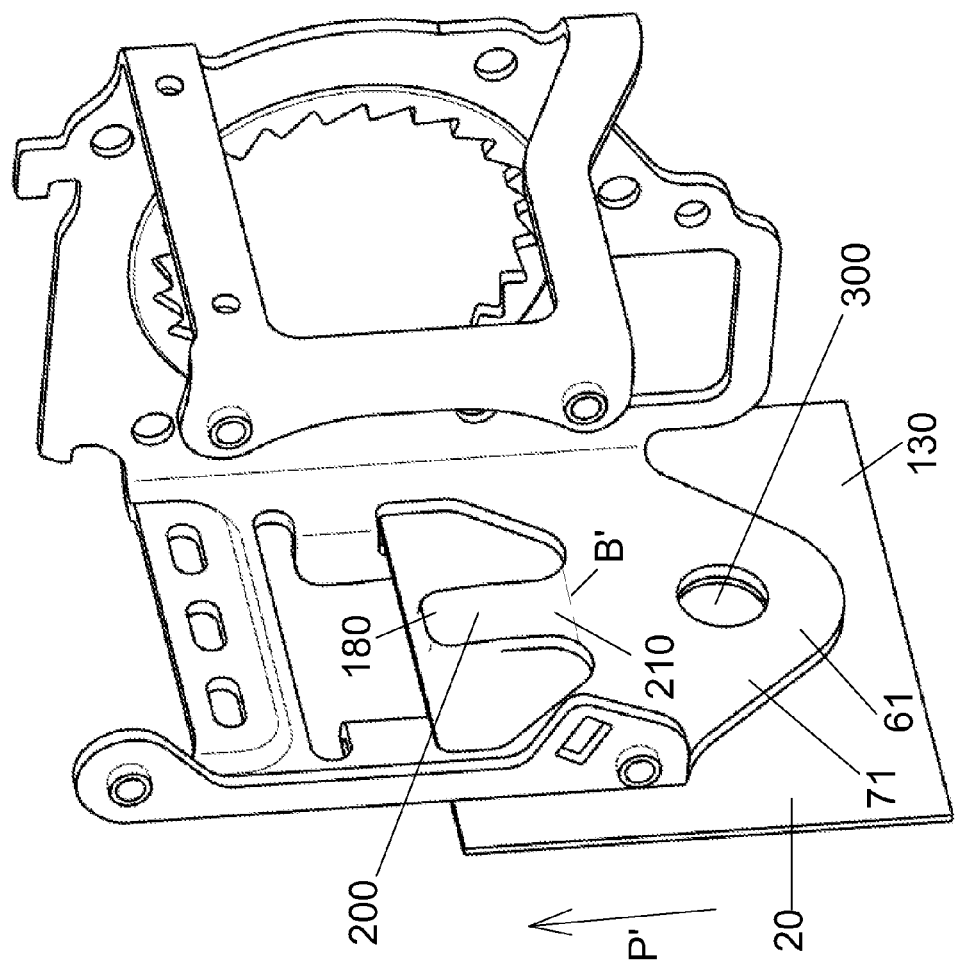
FIG. 4 shows the illustrative embodiment shown in FIG. 1 in a three dimensional view viewed from the front side of the vehicle panel.

FIG. 3 shows the belt retractor frame 10 in another view, in which those parts of the belt retractor frame 10 in FIG. 1 which are behind the vehicle panel 20 can additionally be seen. FIG. 4 shows the belt retractor frame 10 from the front in a view of the front side 130 of the vehicle panel 20. Reference will be made to both FIGS. 3 and 4 below.

FIGS. 3 and 4 show a bent tab 180, the function of which is to produce a preload with the vehicle panel 20 after the belt refractor frame 10 has been hooked in and, in the process, to exert a pressure load on the vehicle panel 20.

In FIGS. 3 and 4, it can be seen that the surface section 190 of the vehicle panel 20 on which the tab 180 exerts a pressure is at a distance from the panel edge 50 of the vehicle panel 20.

The tab 180 is formed by a plate section 200 of frame plate section 61, which is bent out of the frame plate plane 71 in the direction of the vehicle panel 20.

Thus, the tab 180 and the two hooks 30 and 40 are bent out of the same frame plate plane 71 of the same frame plate section 61.

It can furthermore be seen in FIGS. 3 and 4 that the bent tab 180 has a connecting region 210, by means of which it is attached to the rest of frame plate section 61. From this connecting region 210 or from the bending edge B', the tab 180 extends in a direction P' which is antiparallel to the direction of extension P of the two rear engagement sections 110 of the two hooks 30 and 40 (cf FIG. 2). Here, the term "antiparallel" alignment is understood to mean that, although the tab 180 extends parallel to the rear engagement sections 110, the directions are opposed.

The bending edges or folding edges B of the two hooks 30 and 40 at the transition to the frame plate plane 71 are preferably perpendicular to the bending edges B' or folding edges of the tab 180. Thus, the bending edges B or folding edges of the two hooks 30 and 40 are preferably perpendicular to the virtual connecting line between the bearing sections 100 of the two hooks 30 and 40 on the panel edge 50 and perpendicular to the axis of rotation of the inserted locking flange and hence in the z direction of the vehicle coordinate system (cf FIGS. 1 and 2). The bending edges B' or folding edges of the tab 180, on the other hand, preferably run parallel to the virtual connecting line between the bearing sections 100 of the two hooks 30 and 40 on the panel edge 50 and parallel to the axis of rotation of the inserted locking flange and hence perpendicularly to the z direction of the vehicle coordinate system.

It can furthermore be seen from FIGS. 1 to 4 that the tab 180 is preferably arranged centrally between the two hooks 30 and 40, when viewed perpendicularly to the frame plate plane 71 of frame plate section 61; such an arrangement promotes uniform pressure distribution and secure fixing of the belt retractor frame 10 after mounting on the vehicle panel 20.

As FIGS. 1 to 4 show by way of example, the belt retractor frame 10 can additionally have one or more fixing holes 300, which allow the belt retractor frame 10 to be screwed to the vehicle panel 20 after being hooked in on the panel edge 50.

The priority application, German Patent Application 10 2010 006 955.8, filed Feb. 2, 2010 is incorporated by reference herein.

What is claimed is:

1. A belt retractor frame, which is suitable for fixing at a vehicle panel,
    wherein the belt retractor frame has:
    at least one hook for hooking the belt retractor frame into the vehicle panel,
    wherein the at least one hook is adapted to be placed on a rectilinear panel edge section of a panel edge of the vehicle panel and engages a rear side of the vehicle panel, and
    at least one bent tab, which produces a preload with the vehicle panel after the at least one hook has been hooked in,
    wherein the at least one bent tab is formed by a plate section of a frame plate which is bent out of a frame plate plane of the belt retractor frame in the direction of the vehicle panel, namely in such a way that it exerts a pressure load on a surface section of a front side of the vehicle panel, and
    wherein the surface section of the front side of the vehicle panel on which the bent tab exerts the preload is at a distance from the rectilinear panel edge of the vehicle panel.

2. The belt retractor frame as claimed in claim 1, wherein the at least one hook has:
    a bearing section, which rests on a panel edge of the vehicle panel after the hook has been hooked in, and
    a rear engagement section, which adjoins the bearing section and engages behind the rear side of the vehicle panel once the belt retractor frame has been hooked in from the front side of the vehicle panel.

3. The belt retractor frame as claimed in claim 1, wherein the belt retractor frame is formed by an integral frame plate which is bent several times and has a plurality of frame plate sections, and
    the at least one hook is formed by a plate section which is bent out of the frame plate plane of one of the frame plate sections.

4. The belt retractor frame as claimed in claim 2, wherein,
    the bearing section of the at least one hook belongs to a first plate subsection, which is at an angle of 90 degrees to the frame plate plane,
    the rear engagement section of the at least one hook is formed by a second plate subsection, and
    the direction of extension (P) of the second plate subsection is parallel to the frame plate plane.

5. The belt retractor frame as claimed in claim 4, wherein the second plate subsection rests against the rear side of the vehicle panel by means of an inner plate edge after the belt retractor frame has been hooked in.

6. The belt retractor frame as claimed in claim 1, wherein the at least one bent tab extends from a connecting region thereof, which connects it to the rest of the belt retractor frame, in a direction which is antiparallel to the direction of extension of the rear engagement section of the hook.

7. The belt retractor frame as claimed in claim 1, wherein the at least one tab is formed by a plate section of a frame plate which is bent out of a frame plate plane of the frame plate.

8. The belt retractor frame as claimed in claim 7, wherein the at least one tab and the at least one hook are bent out of the same frame plate plane of the same frame plate section.

9. The belt retractor frame as claimed in claim 3, wherein at least two hooks and at least one tab are bent out in a frame plate section of the frame plate,
    there is a further frame plate section, which is arranged perpendicularly to said frame plate section,
    there is a hole with locking teeth in the further frame plate section, into which teeth a locking flange of the belt retractor can be inserted, and
    the arrangement of the two hooks is chosen in such a way that a virtual connecting line between bearing sections of the two hooks runs parallel to the axis of rotation of the inserted locking flange.

10. An arrangement having the belt retractor frame and the vehicle panel as claimed in claim 1,
    wherein at least two hooks of the belt retractor frame are placed on a rectilinear panel edge section, without cutouts, of a panel edge of the vehicle panel.

11. The belt retractor frame as claimed in claim 1, which is suitable for fixing in a vehicle,
    wherein the belt retractor frame is formed by an integral frame plate which is bent several times and has a plurality of frame plate sections,
    wherein the belt retractor frame has the at least one hook for hooking the belt retractor frame into a vehicle panel,
    wherein the at least one hook is formed by a plate section which is bent out of the frame plate plane of one of the frame plate sections,
    wherein a further frame plate section is arranged perpendicularly to one frame plate section,
    wherein there is a hole with locking teeth in the further frame plate section, into which teeth a locking flange of the belt retractor can be inserted,
    wherein the belt retractor frame has the at least one bent tab, which produces a preload with the vehicle panel after the at least one hook has been hooked in, and
    wherein the bending edge of the at least one hook is perpendicular to the axis of rotation of the inserted locking flange at the transition to the frame plate plane of one frame plate section.

12. The belt retractor frame as claimed in claim 3, wherein the at least one tab and the at least one hook are bent out of the same frame plate plane of the same frame plate section, and
    the bending edge of the tab is perpendicular to the bending edge of the at least one hook and runs parallel to the axis of rotation of an inserted locking flange.

13. The belt retractor frame as claimed in claim 3, wherein the at least two hooks and the at least one tab are bent out in one frame plate section of the frame plate,
    the arrangement of the two hooks is chosen in such a way that a virtual connecting line between the bearing sections of the two hooks runs parallel to the axis of rotation of the inserted locking flange, and
    the bending edges of the two hooks are perpendicular to the virtual connecting line.

14. An arrangement having a belt retractor frame and a vehicle panel,
- wherein the belt retractor frame has at least one hook for hooking the belt retractor frame into the vehicle panel and at least one bent tab, which produces a preload with the vehicle panel after the at least one hook has been hooked in,
- wherein the at least one hook is adapted to be placed on a rectilinear panel edge section of a panel edge of the vehicle panel and engages a rear side of the vehicle panel,
- wherein the at least one bent tab is formed by a plate section of a frame plate which is bent out of a frame plate plane of the belt retractor frame in the direction of the vehicle panel, namely in such a way that it exerts a pressure load on a surface section of a front side of the vehicle panel, and
- wherein the surface section of the front side of the vehicle panel on which the bent tab exerts the preload is at a distance from the rectilinear panel edge of the vehicle panel.

15. The arrangement of claim 14
- wherein the bent tab ends below the rectilinear panel edge section of the panel edge of the vehicle panel, and
- wherein the surface section of the front side of the vehicle panel on which the bent tab exerts the preload is at a distance below the panel edge of the vehicle panel.

16. The arrangement of claim 14
- wherein the belt retractor frame has at least two hooks for hooking the belt retractor frame into a vehicle panel,
- wherein the at least two hooks of the belt retractor frame are placed on the rectilinear panel edge section of the panel edge of the vehicle panel, and
- wherein the at least one bent tab extends from a connecting region thereof, which connects it to the rest of the belt retractor frame, in a direction which is antiparallel to the direction of extension of the rear engagement section of the hooks.

17. The arrangement of claim 16
- wherein the bent tab ends below the rectilinear panel edge section of the panel edge of the vehicle panel, and
- wherein the surface section of the front side of the vehicle panel on which the bent tab exerts the preload is at a distance below the panel edge of the vehicle panel.

18. The arrangement of claim 14, wherein the rectilinear panel edge section where the at least one hook is placed is cutout-free.

19. The arrangement of claim 16, wherein the rectilinear panel edge section where the at least two hooks are placed is cutout-free.

* * * * *